(12) United States Patent
Wallace et al.

(10) Patent No.: US 11,221,749 B2
(45) Date of Patent: Jan. 11, 2022

(54) ELECTRONIC DEVICE WITH TOUCHPAD DISPLAY

(71) Applicant: Lenovo (Singapore) Pte. Ltd., New Tech Park (SG)

(72) Inventors: Brian William Wallace, Wake Forest, NC (US); Cuong Huy Truong, Cary, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 531 days.

(21) Appl. No.: 15/338,821

(22) Filed: Oct. 31, 2016

(65) Prior Publication Data

US 2018/0120985 A1     May 3, 2018

(51) Int. Cl.
| | | |
|---|---|---|
| *G06F 3/0488* | (2013.01) | |
| *G06F 3/0354* | (2013.01) | |
| *G06F 1/16* | (2006.01) | |
| *G06F 3/038* | (2013.01) | |

(52) U.S. Cl.
CPC ............ *G06F 3/0488* (2013.01); *G06F 1/169* (2013.01); *G06F 1/1616* (2013.01); *G06F 1/1692* (2013.01); *G06F 3/038* (2013.01); *G06F 3/03547* (2013.01); *G06F 3/04886* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,668,081 | B1 * | 12/2003 | Ilan ..................... | G06F 3/04883 178/18.03 |
| 2002/0191029 | A1 * | 12/2002 | Gillespie ............... | G06F 3/0481 715/810 |
| 2005/0024341 | A1 * | 2/2005 | Gillespie ............... | G06F 1/1616 345/173 |
| 2005/0162402 | A1 * | 7/2005 | Watanachote ...... | G06F 3/03547 345/173 |
| 2006/0071915 | A1 * | 4/2006 | Rehm ................... | G06F 1/1616 345/173 |
| 2009/0303022 | A1 * | 12/2009 | Griffin .................... | G06F 3/016 340/407.2 |
| 2010/0138763 | A1 * | 6/2010 | Kim ....................... | G06F 3/048 715/765 |
| 2010/0184485 | A1 * | 7/2010 | Kim ....................... | G06F 3/1423 455/566 |
| 2010/0245260 | A1 * | 9/2010 | Louch .................... | G06F 3/038 345/173 |

(Continued)

*Primary Examiner* — Temesghen Ghebretinsae
*Assistant Examiner* — Sosina Abebe
(74) *Attorney, Agent, or Firm* — The Small Patent Law Group LLC; Dean D. Small

(57) ABSTRACT

An electronic device, method and computer program product are provided. The electronic device comprises a memory to store program instructions, one or more processors to execute the program instructions, and a main body unit. The main body unit has a housing comprising a top side. The main body unit further includes a keyboard and a touchpad disposed along the top side of the housing. The keyboard and the touchpad are located in discrete areas. The touchpad includes a touch sensor and a touchpad display covering at least a portion of the touch sensor. The one or more processors display a graphical user interface (GUI) on the touchpad display.

20 Claims, 8 Drawing Sheets

(56) References Cited

U.S. PATENT DOCUMENTS

| | | | |
|---|---|---|---|
| 2010/0277422 A1 | 11/2010 | Muresianu et al. | |
| 2011/0063204 A1* | 3/2011 | Kwak | G09G 3/3453 345/107 |
| 2011/0078624 A1* | 3/2011 | Missig | G06F 3/04883 715/802 |
| 2011/0181534 A1* | 7/2011 | Palacios | G06F 3/0481 345/173 |
| 2011/0185297 A1* | 7/2011 | Reid | G06F 3/04845 715/765 |
| 2012/0151412 A1* | 6/2012 | Mine | G06F 1/169 715/810 |
| 2012/0262392 A1* | 10/2012 | Lin | G06F 1/1616 345/173 |
| 2013/0002573 A1 | 1/2013 | Baba | |
| 2013/0162515 A1* | 6/2013 | Prociw | G06F 1/1616 345/156 |
| 2014/0143676 A1* | 5/2014 | Tan | G06F 3/0484 715/744 |
| 2014/0191977 A1* | 7/2014 | Feng | G06F 3/018 345/173 |
| 2014/0337786 A1* | 11/2014 | Luo | G06F 3/04886 715/773 |
| 2015/0198978 A1* | 7/2015 | Catchpole | G06F 1/1632 345/173 |
| 2015/0378598 A1* | 12/2015 | Takeshi | G06F 3/04886 715/773 |
| 2017/0109039 A1* | 4/2017 | Lemay | G06F 3/04886 |

* cited by examiner

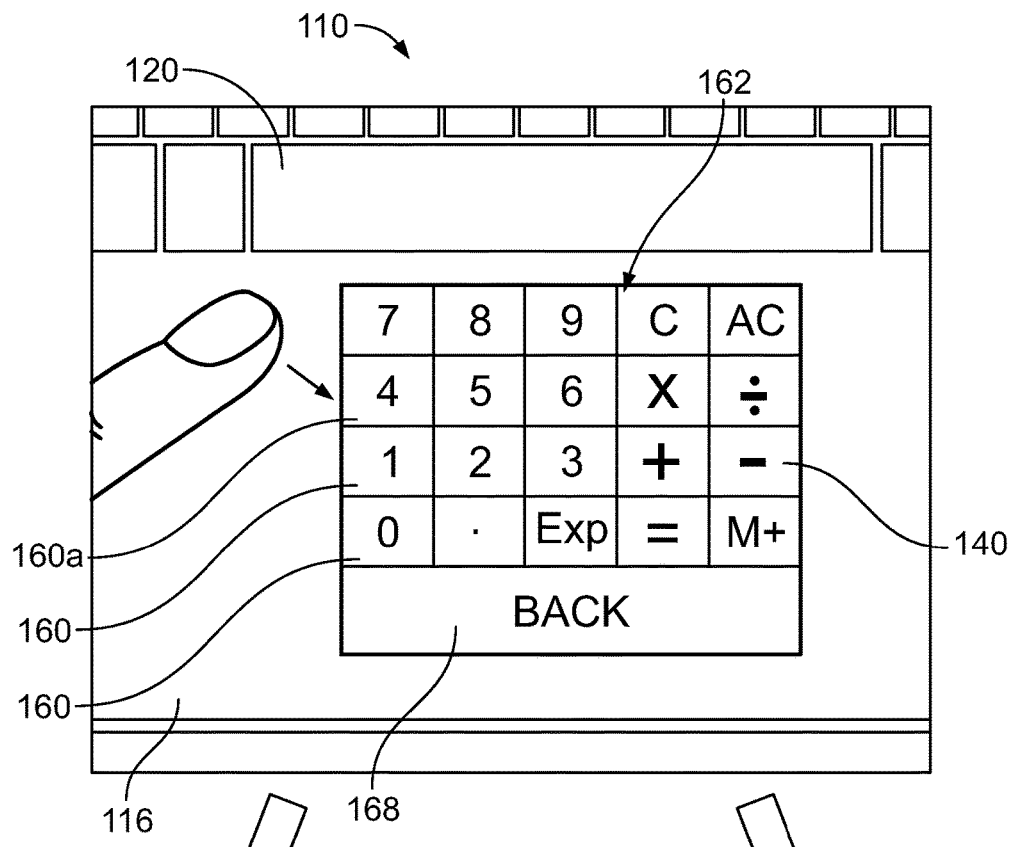
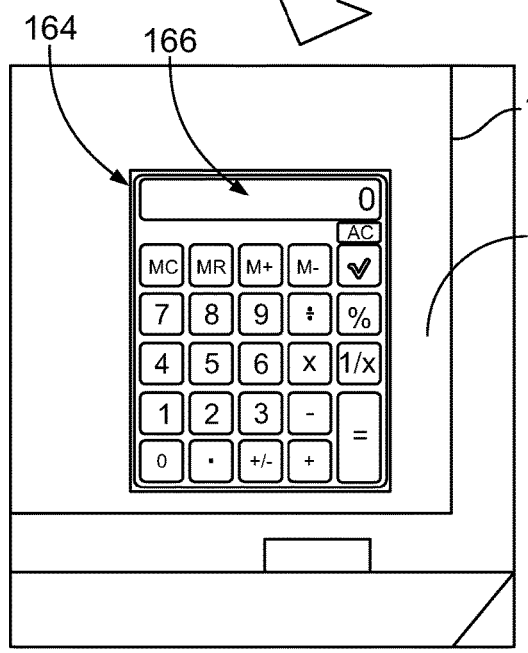
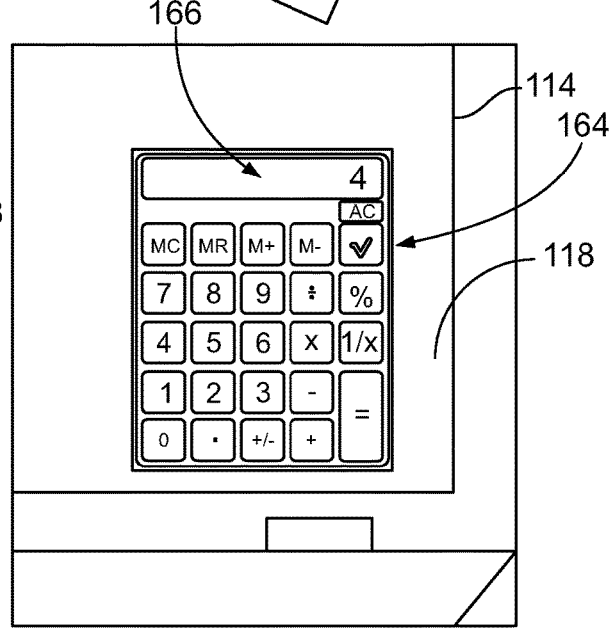
FIG. 3A
FIG. 3B
FIG. 3C

ELECTRONIC DEVICE WITH TOUCHPAD DISPLAY

FIELD

The present disclosure relates generally to electronic devices that include a touchpad and more particularly to a touchpad having a touchpad display.

BACKGROUND OF THE INVENTION

Personal computers (PCs) have become fundamental tools both in personal life and business. The PC offers a relatively large user interface with a keyboard and a separate display that facilitates extended, continuous use. For example, a user may interact with the PC using the keyboard, a mouse, and/or another user-input device, and the user may receive visual content from the PC via the display.

Many PCs are operated with multiple programs open concurrently, such as Internet browsers, media players, word processing documents, spreadsheets, and the like. Since multiple programs may be open, the display screen may be cluttered. For example, in order to view a particular window of an active program, a user may need to close open windows from other active programs and/or select one or more tabs from a taskbar. There may be a desire for additional display space on the PC for presenting program-specific information to the user. Some PCs may address the issue by including large display screens and/or multiple display screens to increase the amount of display space. However, laptop PCs become less convenient and portable as the sizes and/or number of display screens increase. In addition, adding additional display screens to a PC may affect the size and location of other features of the PC, such as the keyboard, camera, etc., as the available space on the PC is reduced.

Furthermore, some of the information that is presented to a user on a display screen may be undesirable and distracting. For example, as a user works on a word processing document, active programs such as an email program or a news program may display notifications on the display screen that obstruct the user's view of the word processing document and/or break the user's concentration directed to the document.

A need remains for improved methods and devices that overcome the disadvantages discussed above and other disadvantages in conventional systems that will become apparent herein.

SUMMARY

In accordance with embodiments herein, an electronic device is provided. The electronic device comprises a memory to store program instructions, one or more processors to execute the program instructions, and a main body unit. The main body unit has a housing comprising a top side. The main body unit further includes a keyboard and a touchpad disposed along the top side of the housing. The keyboard and the touchpad are located in discrete areas of the top side. The touchpad includes a touch sensor and a touchpad display covering at least a portion of the touch sensor. The one or more processors display a graphical user interface (GUI) on the touchpad display.

In accordance with embodiments herein, a method is provided that includes providing an electronic device comprising main body unit including a keyboard and a touchpad on a top side of the main body unit. The keyboard and the touchpad are located in discrete areas of the top side. The touchpad includes a touch sensor and a touchpad display covering at least a portion of the touch sensor. The method also includes providing one or more processors that display a graphical user interface (GUI) on the touchpad display. The GUI on the touchpad display has one or more virtual buttons selectable via a user touch input on the touchpad.

In accordance with embodiments herein, a computer program product comprising a non-transitory computer readable storage medium comprising computer executable code is provided. The computer program product displays a graphical user interface (GUI) on a touchpad display of a touchpad of an electronic device. The GUI has one or more virtual buttons selectable via a user touch input on the touchpad. The GUI is specific to a corresponding program. Responsive to receiving the user touch input on at least one of the one or more virtual buttons of the GUI, the computer program product updates a visual representation of the corresponding program displayed on a primary display of the electronic device.

BRIEF DESCRIPTION OF THE DRAWINGS

FIGS. 3A-3C illustrate portions of the electronic device according to an embodiment.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The terms "content", "display content and "visual content," as used throughout, shall generally refer to any and all textual, graphical, image or video information or data that may be presented on a display of an electronic device. The content may represent various types of incoming and outgoing textual, graphical, image and video content including, but not limited to, calendar events, email, text messages, alerts, still images, video, advertisements, company information (e.g., company logo, advertisements), screen saver, personalized visual information and the like.

Figures 1, 2:
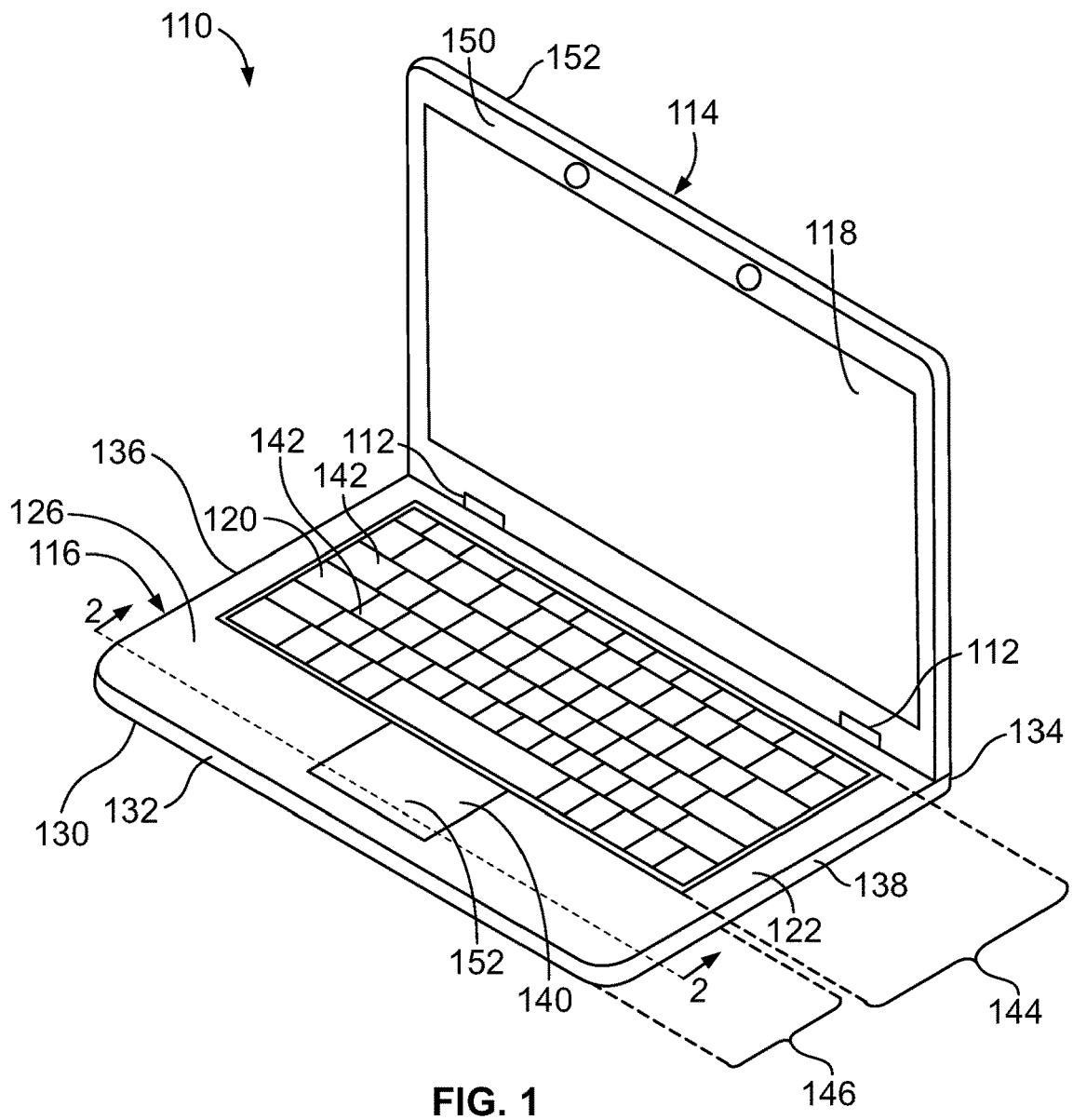
FIG. 1 is a perspective view of an electronic device formed according to one embodiment herein.
FIG. 2 illustrates a close-up cross-sectional view of a touchpad of the electronic device according to an embodiment along the line 2-2 in FIG. 1.

FIG. 1 is a perspective view of an electronic device 110 formed according to one embodiment herein. The electronic device 110 includes a main body unit 116 that includes a housing 122. The housing 122 in the illustrated embodiment has a flat, box-shaped structure including a top side 126 and an opposite bottom side 130. As used herein, relative or spatial terms such as "top," "bottom," "front," "rear," "first," and "second" are only used to distinguish the referenced elements and do not necessarily require particular positions or orientations relative to the surrounding environment of the electronic device 110. The housing 122 extends longitudinally between a front side 132 and a rear side 134, and laterally between first and second sides 136, 138. Optionally, the housing 122 may be defined by a top cover that defines the top side 126 and a bottom cover that defines the bottom side 130.

The main body unit 116 includes at least one user-interface device. In the illustrated embodiment, the main body unit 116 includes a keyboard 120 and a touchpad 140. The keyboard 120 includes multiple discrete depressible keys 142. The touchpad 140 is configured to receive user touch inputs in the form of taps, swipes, or the like. The keyboard 120 and the touchpad 140 are disposed along the top side 126 of the housing 122. For example, the main body unit 116 may be oriented such that the bottom side 130 rests on a table or other supporting structure and the top side 126 faces upward towards a user's hands located above the top side 126. The touchpad 140 is located in a separate, discrete area of the top side 126 relative to the location of the keyboard 120. For example, the keyboard 120 is located in a first region 144, and the touchpad 140 is located in a different, second region 146. In the illustrated embodiment, the first region 144 is rearward of the second region 146, such that the touchpad 140 is disposed more proximate to the front side 132 than the proximity of the keyboard 120 to the front side 132. Alternatively, the touchpad 140 may be rearward of the keyboard 120 or disposed laterally next to the keyboard 120. The keyboard 120 and the touchpad 140 do not overlap. In the illustrated embodiment, the keyboard 120 occupies a greater area of the top side 126 of the housing 122 relative to the touchpad 140. Alternatively, the size of the touchpad 140 may be approximately equal to or greater than the size of the keyboard 120. Furthermore, both the keyboard 120 and the touchpad 140 have generally rectangular shapes, but one or both may have a different shape in an alternative embodiment (e.g., the touchpad 140 may be oval-shaped).

In the illustrated embodiment, the electronic device 110 includes the main body unit 116 and a display unit 114 that is mechanically coupled to the main body unit 116. The display unit 114 includes a front face 150 and an opposite rear face 152. The display unit 114 includes a primary display 118 on the front face 150. The primary display 118 may include a liquid crystal display (LCD) screen, a plasma screen, a light emitting diode (LED) screen, an organic light emitting diode (OLED) screen, an electronic paper screen, or the like.

In one or more embodiments, the electronic device 110 is a laptop PC. Although the electronic device 110 is shown as a laptop PC, the embodiments described herein may be suitably applied to other electronic devices such as phones, game devices, electronic organizers, wearable electronic devices, and the like. The display unit 114 is pivotably coupled to the main body unit 116 at the rear side 134 via hinges 112. The display unit 114 is pivotable about the hinges 112 between a closed position and an open position. In the closed position, the display unit 114 has a zero-degree angle relative to the main body unit 116 and the primary display 118 on the front face 150 faces the keyboard 120 and touchpad 140 on the top side 126. In the open position, the display unit 114 has a non-zero angular position relative to the main body unit 116, such as an angular position in the range of 60 degrees to 135 degrees or more, to allow a user interacting with the keyboard 120 and/or touchpad 140 to view the primary display 118. The display unit 114 may be electrically connected to the main body unit 116 via an electrical or optical cable (not shown). The cable optionally may extend through one of the hinges 112.

Figure 12:
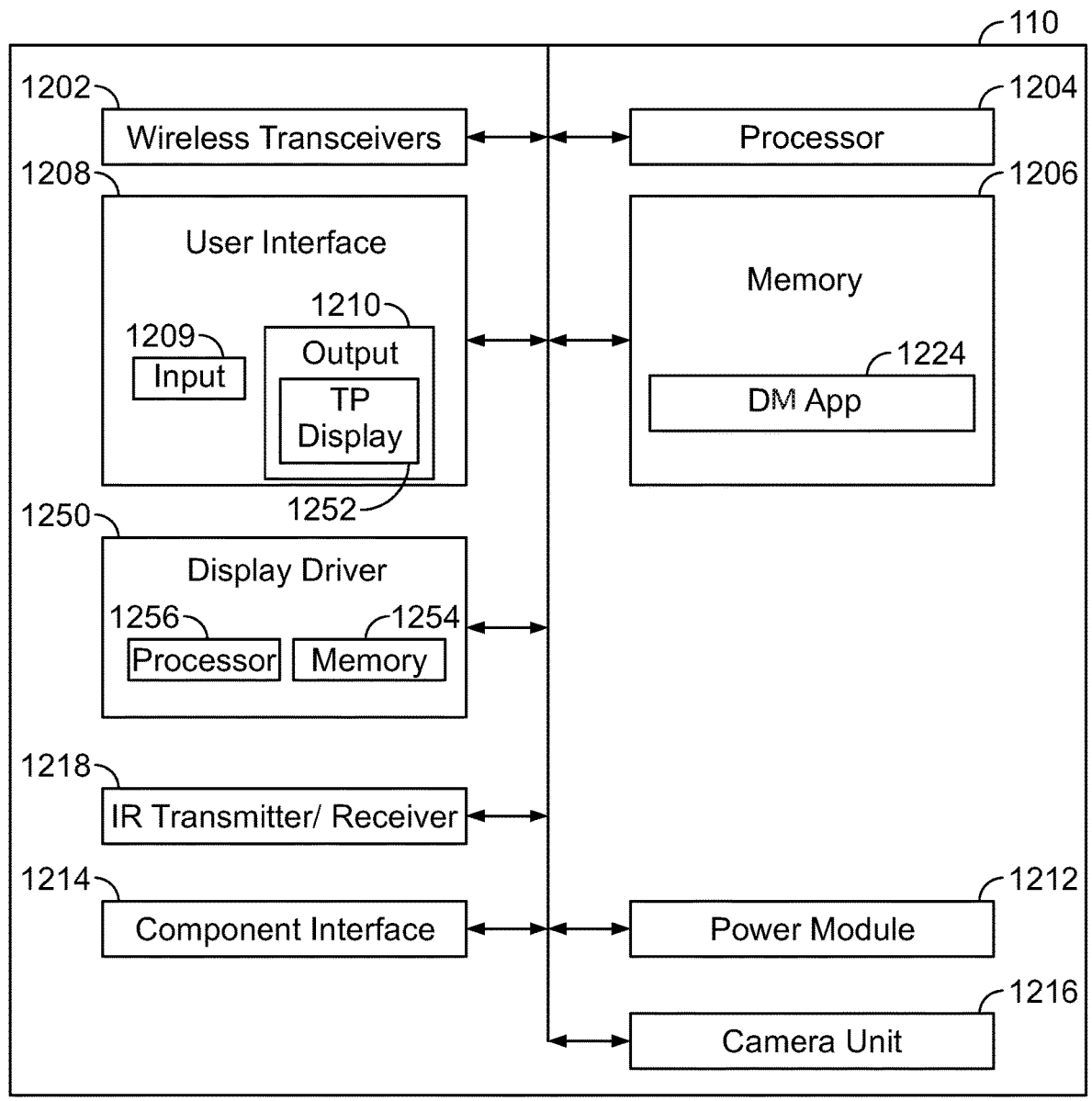
FIG. 12 illustrates a simplified block diagram of internal components of the electronic device configured to manage content display on a touchpad display in accordance with embodiments herein.

The main body unit 116 is operatively connected to a memory (e.g., the memory 1206 shown in FIG. 12) and one or more processors (e.g., the processor 1204 shown in FIG. 12). The memory stores program instructions for visually displaying and interacting with various programs (also referred to herein as applications). The one or more processors are configured to access the memory and execute the program instructions, such as responsive to user inputs entered via the keyboard 120 and/or the touchpad 140. In one or more embodiments, the memory and the one or more processors are contained within the housing 122 of the main body unit 116. Alternatively, the memory and/or the one or more processors may be contained within the display unit 114 and operatively coupled to the main body unit 116 (and the keyboard 120 and touchpad 140 thereof) via one or more cables extending between the units 114, 116. In another alternative embodiment, the memory and/or the one or more processors may be contained in another housing that operatively couples to the main body unit 116 conductively via a cable or wirelessly via a wireless transceiver (e.g., the wireless transceiver 1202 shown in FIG. 12) of the main body unit 116. For example, the electronic device 110 may include the main body unit 116 only (e.g., lacking the display unit 114), and may be configured to operatively connect to a separate electronic computing device (e.g., a desktop computer) that includes a memory and a processor.

The touchpad 140 has an operative surface 152 that is exposed along the top side 126. The operative surface 152 is configured to receive the user touch inputs of a person using the electronic device 110. The touchpad 140 includes a touch sensor (e.g., touch sensor 202 shown in FIG. 2) and a touchpad display 204 (FIG. 2). The touchpad display may cover at least a portion of the touch sensor. The operative surface 152 may be a transparent screen or a top surface of the touchpad display. The touch sensor detects the presence and location of a user touch input on the operative surface 152 of the touchpad 140. The touchpad display is configured to present visual content to the user at the location of the touchpad 140. The visual content includes graphical user interfaces (GUIs) that present visual content and also are touch-sensitive. The visual content presented to the user at the touchpad 140 via the touchpad display is spaced apart physically from visual content presented to the user via the primary display 118. In one or more embodiments, the touchpad display aligns with the operative surface 152 such that the touchpad display is contained within the borders of the touchpad 140. For example, the touchpad display may have a size that is approximately equal to the size of the touchpad and aligns within the boundaries of the touchpad such that the touchpad display covers an entire or full area of the touchpad 140. Therefore, the touchpad display can present visual content along an entirety of the area of the touchpad 140, including along a full length and width of the touchpad 140. In an alternative embodiment, the touchpad display may be smaller than the touchpad 140. For example, the touchpad display may be located along a rear region of the touchpad 140 proximate to the keyboard 120, and a region of the touchpad 140 in front of the rear region is able to receive user touch inputs but not able to display visual content.

Since the touchpad 140 includes a touchpad display, the electronic device 110 includes a secondary display in addition to the primary display 118 without requiring additional space for the secondary display. For example, the keyboard 120 and touchpad 140 are not reduced in size or moved around to free space for a secondary display screen. The touchpad display can be used to provide program-specific GUIs to the user for interacting with active programs using the touchpad 140 and/or notification-based GUIs for notifying the user of certain information. Furthermore, the touchpad display can be used to provide customizable quick access virtual keys that allow a user to initiate certain programs via selecting the virtual keys on the touchpad 140. The content presented on the touchpad 140 may be more easily accessible than parsing through open windows, documents, media players, and the like on the primary display 118 to access similar content.

FIG. 2 illustrates a close-up cross-sectional view of the touchpad 140 according to an embodiment along the line 2-2 in FIG. 1. In the illustrated embodiment, the touchpad display 204 covers the touch sensor 202, such that the touchpad display 204 is above the touch sensor 202 and located more proximate to the user's hands above the top side 126 (shown in FIG. 1) of the main body unit 116. The touchpad display 204 may be flush with the top side 126 surrounding the touchpad 140 or may be slightly recessed or raised relative to the top side 126. In an alternative embodiment, the touchpad display 204 may be located below the touch sensor 202. For example, the touch sensor 202 may be transparent or at least translucent to allow the touchpad display 204 to be viewable through the touch sensor 202.

The touch sensor 202 includes or comprises a touch sensitive layer 206. The touch sensitive layer 206 is configured to provide touch inputs to the processor. The touch sensitive layer 206 may be electrically conductive or include electrically conductive components or particles therein. The touch sensor 202 may operate based on capacitive sensing or resistive sensing.

In the illustrated embodiment, the touchpad display 204 is an electronic paper screen that displays paper-like graphics. For example, the touchpad display 204 includes an upper electrode layer 208, a core layer 210, and a lower electrode layer 212. The upper electrode layer 208 optionally may define the operative surface 152. The upper electrode layer 208 is transparent. The core layer 210 is disposed between the upper and lower electrode layers 208, 212. The core layer 210 includes colored charged particles that are suspended in a fluid, such as a transparent oil. The different colored particles have different electromagnetic charges. For example, black particles may be negatively charged, while white particles are positively charged. The lower electrode layer 212 is configured to apply an electromagnetic charge that causes a redistribution of the particles within the core layer 210. The lower electrode layer 212 is partitioned to provide multiple pixels 214. Responsive to a first pixel 214 providing a positive charge, the negatively-charged black particles are attracted to the lower electrode layer 212 and the positively-charged white particles are repelled towards the upper electrode layer 208. Therefore, the user viewing the first pixel 214 through the upper electrode layer 208 only sees the white particles. Inversely, the lower electrode layer 212 along the first pixel 214 applying a negative charge results in the black particles being repelled towards the upper electrode layer 208 and the only the black particles visible to the user. The lower electrode layer 212 may have numerous pixels 214 that are independently controlled to provide different graphics. The electronic paper screen is bistable, such that no power is used to retain an image on the screen. Power is only used to change the image. Furthermore, the electronic paper screen may be a reflective display as opposed to a backlit display, such that no backlight is required to illuminate the touchpad display 204. In one embodiment, the electronic paper screen may be an E-Ink™ screen from the E Ink Corporation. In an alternative embodiment, the touchpad display 204 may be include an LCD screen, a plasma screen, an LED screen, an OLED screen, or the like, instead of an electronic paper screen.

FIGS. 3A-3C illustrate portions of the electronic device 110 according to an embodiment. FIG. 3A illustrates a portion of the main body unit 116 showing the touchpad 140 and a portion of the keyboard 120. FIGS. 3B and 3C show a portion of the display unit 114 of the electronic device 110 with a virtual calculator 164 displayed on the primary display 118. In an embodiment, one or more processors (e.g., the processor 1204 shown in FIG. 12) are configured to display a GUI on the touchpad display 204 (shown in FIG. 2) which is visible to a user operating the electronic device 110. The GUI is specific to an active program that is operating on the electronic device 110. For example, a user may initiate a program via a user selection, and the processor may display the specific GUI on the touchpad 140 responsive to the user selection. The user my make the user selection to select the program using the touchpad 140 to move a cursor that is shown on the primary display 118, or may use a mouse or another user input device. The GUI on the touchpad 140 has one or more virtual buttons 160 that are selectable via a user touch input on the touchpad 140.

In the illustrated embodiment, a calculator GUI 162 is shown on the touchpad 140. The calculator GUI 162 includes multiple buttons 160 forming a virtual number pad on the touchpad 140. The multiple buttons 160 in the number pad represent digits 0-9 and operation symbols, such as plus sign, minus sign, and equal sign. In the illustrated embodiment, the calculator GUI 162 covers the entire area of the touchpad 140. The calculator GUI 162 may be presented on the touchpad 140 responsive to a user input that activates a calculator program on the electronic device 110. For example, prior to the calculator program being activated, the touchpad display 204 (shown in FIG. 2) may display a solid color on the touchpad 140, such that the touchpad 140 appears monochromatic white or black, for example. Upon activating the calculator program, the processor controls the touchpad display 204 to display the calculator GUI 162 on the touchpad 140. The processor also may control the primary display 118 to display the virtual calculator 164 on the primary display 118, as shown in insets B and C.

In an embodiment, the program-specific GUI displayed on the touchpad 140 is used to interact with the active program. For example, in response to a user touch input on a particular button 160 of the GUI displayed on the touchpad 140, the processor is configured to execute program instructions of the active program based on the button 160 that is selected. The program instructions may include updating a visual representation of the active program displayed on the primary display 118. In the illustrated embodiment, FIG. 3B shows the virtual calculator 164 on the primary display 118 upon activation of the calculator program. The virtual calculator 164 includes a display window 166 that shows the number 0. In response to a user touch input on the virtual button 160A representing the number 4 on the calculator GUI 162, the processor is configured to display the number 4 in the display window 166 as shown in FIG. 3C. Therefore, the user is able to interact with the calculator program using the calculator GUI 162 that is displayed on the touchpad 140. For example, instead of manipulating a cursor on the primary display 118 as the typical function of the touchpad 140, the user merely touches specific locations of the touchpad 140 to select specific numbers and operations on the calculator GUI 162 for interacting with the calculator program. Interacting with the calculator program using the calculator GUI 162 shown on the touchpad 140 may be more convenient for a user than selecting each number by moving a cursor displayed on the primary display 118 and/or pressing number keys on the keyboard 120.

Optionally, the calculator GUI 162 also includes a virtual "Back" button 168 that, if selected, removes the calculator GUI 162 from being displayed on the touchpad 140. For example, once the user is finished using the calculator program, the user may select the Back button 168, which removes the calculator GUI 162 from the touchpad 140. Once the calculator GUI 162 is removed, the touchpad 140 may function as a typical touchpad, allowing the user touch inputs to move a cursor on the primary display 118.

In an embodiment, the calculator GUI 162 is presented via an electronic paper screen of the touchpad display 204 (shown in FIG. 2), and the virtual calculator 164 shown on the primary display 118 is presented via a different display technology, such as LCD, LED, OLED, or the like. Therefore, the display technology of the primary display 118 is different than the touchpad display 204. The touchpad display 204 may be less energy intensive than the primary display 118.

Figure 4:
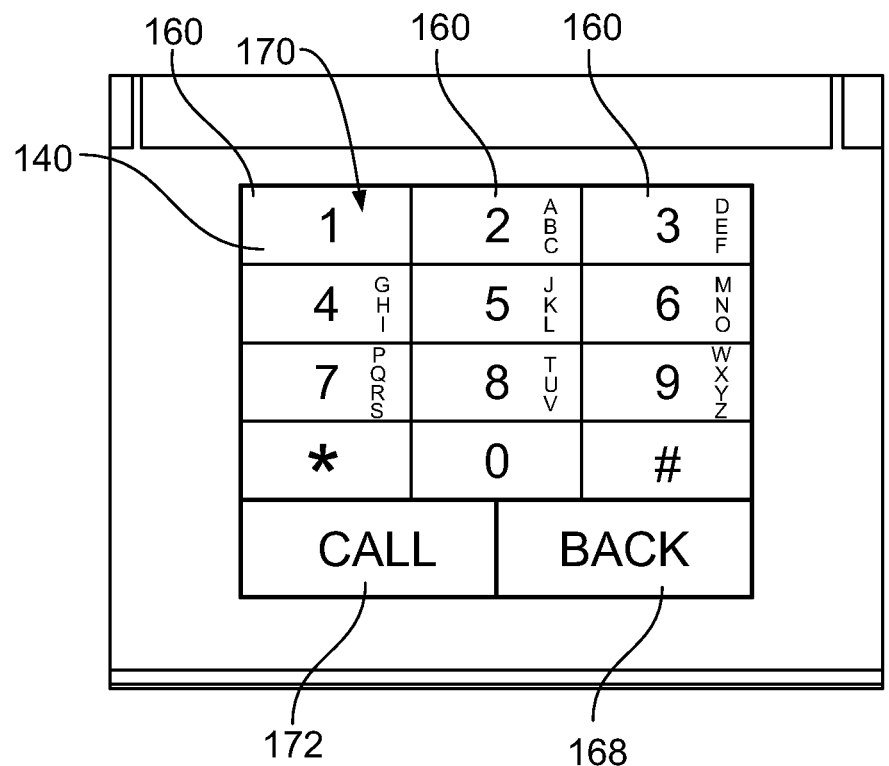
FIG. 4 illustrates the touchpad of the electronic device displaying a phone GUI according to an embodiment.

FIG. 4 illustrates the touchpad 140 of the electronic device 110 (shown in FIG. 1) displaying a phone GUI 170 according to an embodiment. The virtual buttons 160 of the phone GUI 170 represent a virtual dial pad. For example, upon activation of a phone program on the electronic device 110, a processor (e.g., the processor 1204 shown in FIG. 12) may control the touchpad display 204 (shown in FIG. 2) to display the phone GUI 170 on the touchpad 140. The user may dial a phone number by tapping on the touchpad 140 in the location of the virtual buttons 160 of the phone GUI 170. The user may tap the touchpad 140 in the location of a Call button 172 to dial a typed phone number and initiate a call. The user may tap the touchpad 140 in the location of the Back button 168 to remove the phone GUI 170 from the touchpad 140.

Figure 5:
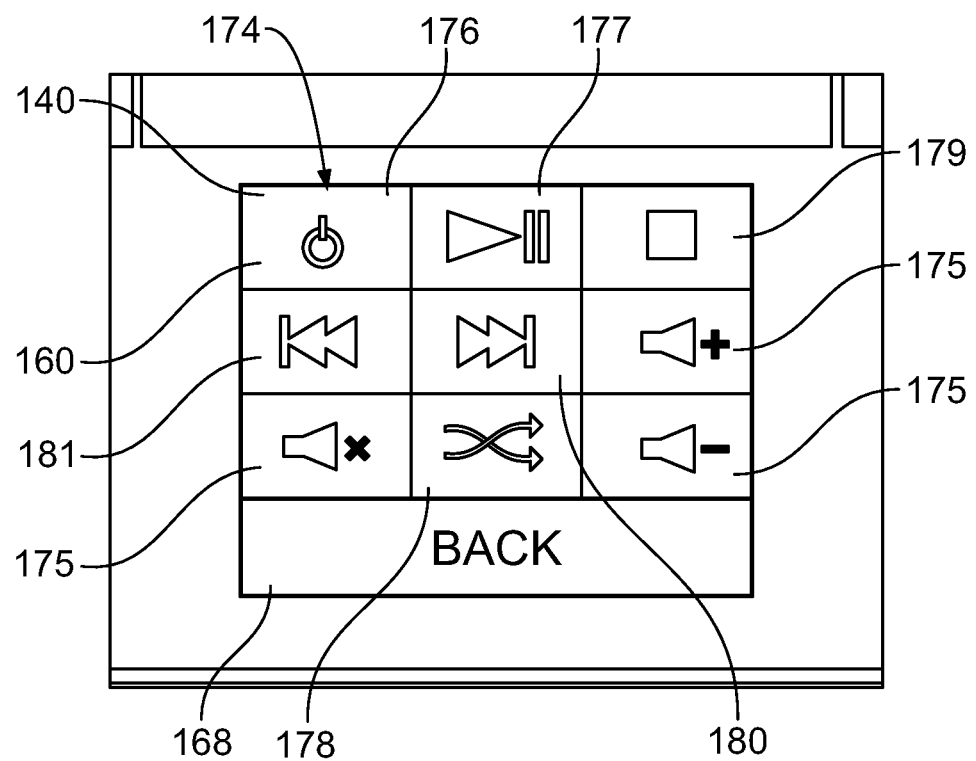
FIG. 5 illustrates the touchpad of the electronic device displaying a media control GUI according to an embodiment.

FIG. 5 illustrates the touchpad 140 of the electronic device 110 (shown in FIG. 1) displaying a media control GUI 174 according to an embodiment. The virtual buttons 160 of the media control GUI 174 represent media control operations. For example, the media control GUI 174 may be used for controlling operations of an audio player, a video player, or an audio and video player. Responsive to a processor (e.g., the processor 1204 shown in FIG. 12) executing (e.g., operating, running, etc.) a media player program, the processor may control the touchpad display 204 (shown in FIG. 2) to display the media control GUI 174 on the touchpad 140. The user may control the operations of the media player by tapping various locations of the touchpad 140 corresponding to different buttons 160 of the media control GUI 174. In the illustrated embodiment, the buttons 160 include volume control buttons 175, an ON/OFF button 176, a play/pause button 177, a shuffle button 178, a stop button 179, a next track/fast forward button 180, and a previous track/rewind button 181. For example, a user may switch to a next song in a playlist by tapping the touchpad 140 in the area of the next track button 180. The user may tap the Back button 168 to remove the media control GUI 170 from the touchpad 140.

Figure 6:
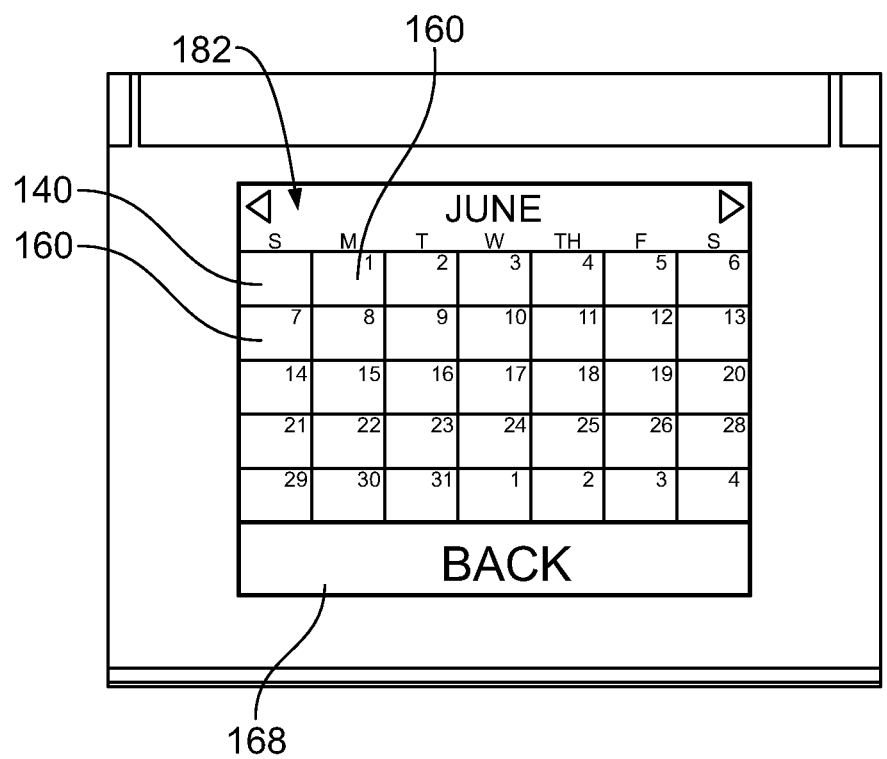
FIG. 6 illustrates the touchpad of the electronic device displaying a calendar GUI according to an embodiment.

FIG. 6 illustrates the touchpad 140 of the electronic device 110 (shown in FIG. 1) displaying a calendar GUI 182 according to an embodiment. The calendar GUI 182 may be used for viewing and updating content in a calendar program. The calendar GUI 182 may be displayed on the touchpad 140 responsive to a processor (e.g., the processor 1204 shown in FIG. 12) activating the calendar program. The virtual buttons 160 of the calendar GUI 182 represent days of the month. The user may view or update content corresponding to a specific day of the month by tapping on the virtual button 160 of that day of the month. Upon selecting a day of the month, content may be displayed, such as events and reminders scheduled for that day of the month. The user may also be presented with an option to update the content, such as by deleting events and reminders, adding events and reminders, or modifying events and reminders. The calendar GUI 182 also includes the Back button 168 to close or remove the calendar GUI 182 from the touchpad 140.

Figure 7:
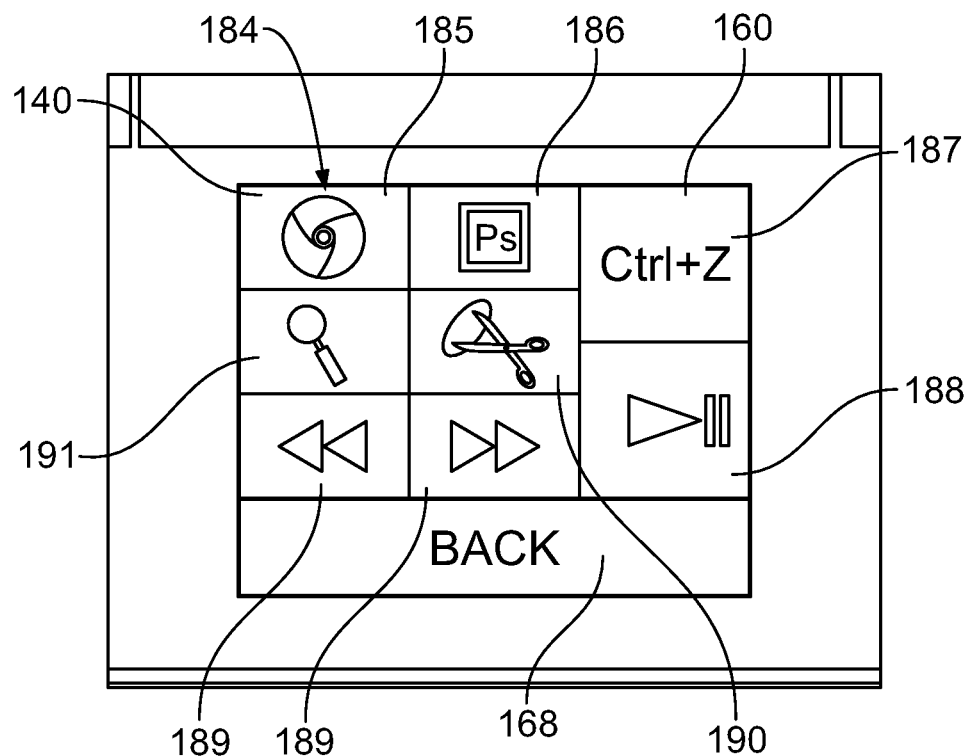
FIG. 7 illustrates the touchpad of the electronic device displaying a configurable hotkey GUI according to an embodiment.

FIG. 7 illustrates the touchpad 140 of the electronic device 110 (shown in FIG. 1) displaying a configurable hotkey GUI 184 according to an embodiment. The configurable hotkey GUI 184 may be used for initiating programs and/or performing certain operations within active programs. In the illustrated embodiment, the virtual buttons 160 in the hotkey GUI 184 include an Internet browser button (e.g., Google™ Chrome™) 185, an Adobe™ Photoshop™ button 186, an undo (Ctrl+Z) button 187, a play/pause button 188, track change buttons 189, a cut button 190, and a search button 191. The Internet browser button 185 and the Photoshop™ button 186 may be tapped by a user touch input on the touchpad 140 to initiate the respective programs. The other virtual buttons 187-191 shown in the hotkey GUI 184 may be used for controlling operations in certain programs, such as media player programs (e.g., the play/pause button 188 and track change buttons 189), word processing programs (e.g., the undo button 187, the cut button 190, and the search button 191), and the like. The specific buttons 160 of the hotkey GUI 184 may be configurable such that a user can select which buttons 160 are displayed in the hotkey GUI 184. For example, the hotkey GUI 184 in another embodiment could include a print button, a save button, an email button, volume control buttons, an application store button, and/or the like. The hotkey GUI 184 may be displayed on the touchpad 140 (via the touchpad display 204 shown in FIG. 2) in response to a user selecting a specific key on the keyboard 120 (shown in FIG. 1). The hotkey GUI 184 also includes the Back button 168 to close or remove the hotkey GUI 184 from the touchpad 140.

Figure 8:
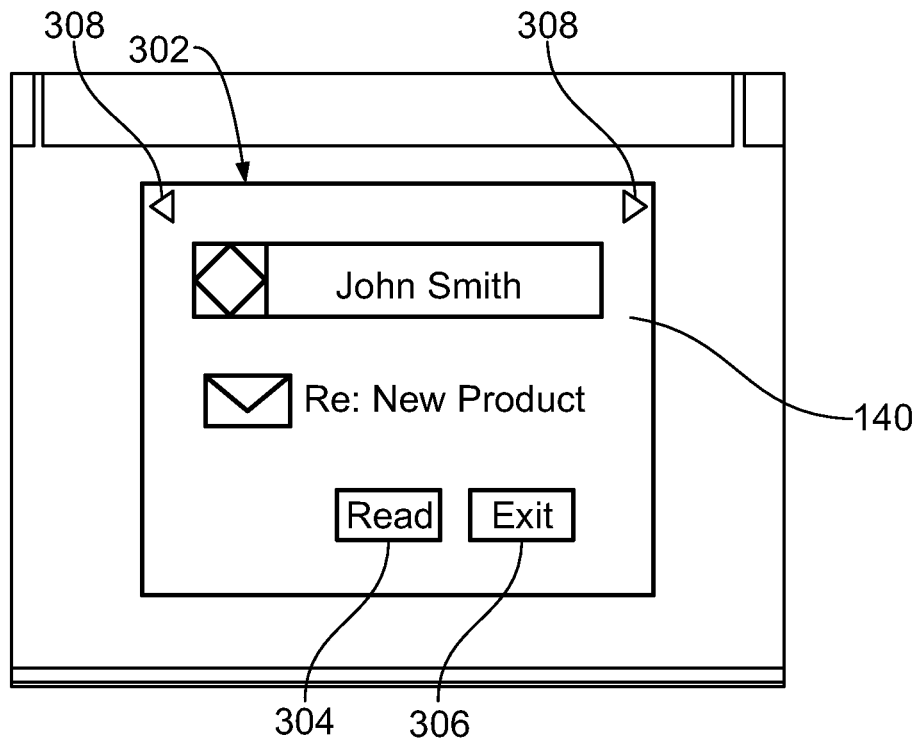
FIG. 8 illustrates the touchpad of the electronic device displaying an incoming message notification GUI according to an embodiment.

FIG. 8 illustrates the touchpad 140 of the electronic device 110 (shown in FIG. 1) displaying an incoming message notification GUI 302 according to an embodiment. The incoming message notification GUI 302 in the illustrated embodiment represents a received email message, but the incoming message notification GUI 302 may also display received text messages, voicemail messages, or the like. The message notification GUI 302 is displayed on the touchpad 140 via the touchpad display 204 (shown in FIG. 2). The message notification GUI 302 identifies the source of the message as "John Smith" and the subject of the message as "New Product." The message notification GUI 302 also includes multiple virtual buttons, including a Read button 304 and an Exit button 306. In response to the user tapping the touchpad 140 on the Read button 304, a processor (e.g., the processor 1204 shown in FIG. 12) may display the content of the message on the touchpad 140 and/or on the primary display 118 (shown in FIG. 1). In response to the user tapping the touchpad 140 on the Exit button 306, the processor may remove or close the incoming message notification GUI 302 on the touchpad 140, such that a previous mode of the touchpad is displayed on the touchpad display. The previous mode may be a cursor-manipulation mode in which user touch inputs on the touchpad are used to control the movement of a cursor on the primary display of the electronic device. In the cursor-manipulation mode, the touchpad display may display a monochromatic color, such as black, grey, green, or silver.

In an embodiment, the processor may control the touchpad display 204 to display the incoming message notification GUI 302 automatically upon receipt of an incoming message (e.g., receipt of data representative of the message). Alternatively, the processor may display the incoming message notification GUI 302 responsive to a user input initiating or opening a message program. For example, in response to the user opening an email program, the processor controls the touchpad display 204 to display the incoming message notification GUI 302 for any new messages that have been received since the previous time the email program was opened. The incoming message notification GUI 302 may also include arrow buttons 308 for scrolling between multiple message notifications.

Figure 9:
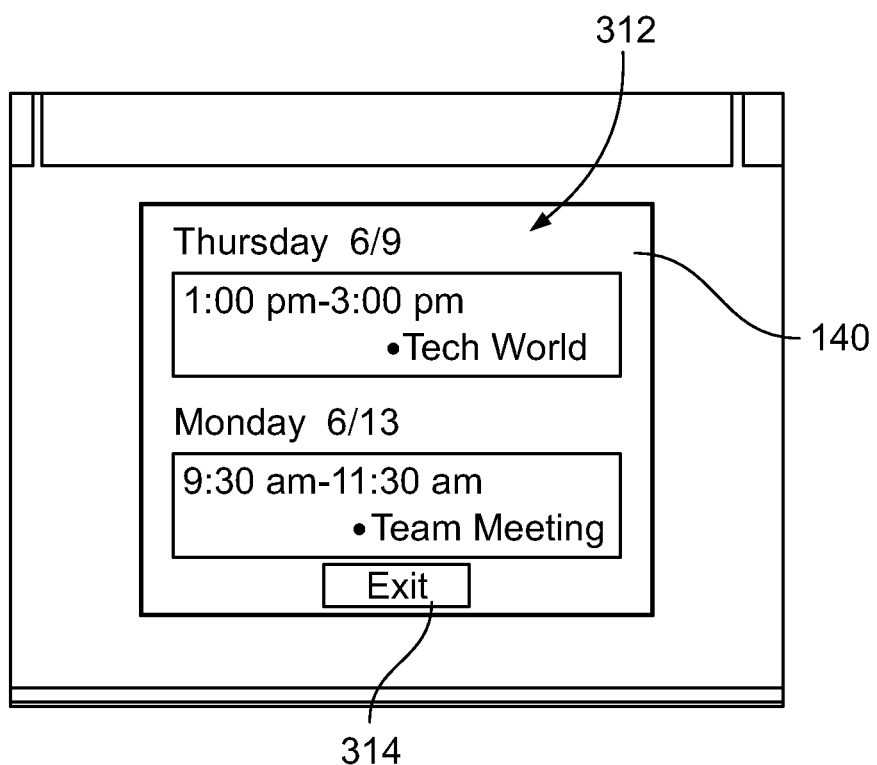
FIG. 9 illustrates the touchpad of the electronic device displaying a schedule reminder notification GUI according to an embodiment.

FIG. 9 illustrates the touchpad 140 of the electronic device 110 (shown in FIG. 1) displaying a schedule reminder notification GUI 312 according to an embodiment. The schedule reminder notification GUI 312 may present reminder information from various programs, such as a calendar program, a reminder program, or the like. The reminder notification GUI 312 may represent scheduled events, meetings, tasks, or the like. In the illustrated embodiment, the schedule reminder notification GUI 312 includes a first reminder for TechWorld from 1 P.M. to 3 P.M. on Thursday 6/9, and a second reminder for a Team Meeting from 9:30 A.M. to 11:30 A.M. on Monday 6/13. The schedule reminder notification GUI 312 may be shown responsive to a user activating a scheduling program. In addition, or alternatively, the schedule reminder notification GUI 312 may be shown automatically at a designated amount of time before a scheduled event. For example, the schedule reminder notification GUI 312 may be displayed on the touchpad 140 at 12:30 P.M on Thursday 6/9, which is thirty minutes before the TechWorld event is scheduled to begin. The schedule reminder notification GUI 312 includes an Exit button 314 for closing the schedule reminder notification GUI 312 from being displayed on the touchpad 140. The schedule reminder notification GUI 312 may be configured such that a user touch input on the touchpad 140 in the area of the TechWorld event opens a window on the primary display 118 (shown in FIG. 1) that displays more detail about the TechWorld event, and a user touch input in the area of the Team Meeting event displays more detail about the Team Meeting event on the primary display 118.

In addition to displaying schedule reminder notification GUIs, the touchpad display 204 (shown in FIG. 2) may also be controlled to display event invitation notification GUIs (not shown). For example, an event invitation may be displayed on the touchpad 140 responsive to receipt of data representative of an event invitation. The event invitation may display a scheduled title of the event and a scheduled date and time of the event. Furthermore, the event invitation GUI may also include a first virtual button for accepting the event invitation, a second button for rejecting the event invitation, a third button for displaying more detail about the event (e.g., such as displaying event details on the primary display 118 shown in FIG. 1), and a fourth button for removing the event invitation from being displayed on the touchpad 140.

Figure 10:
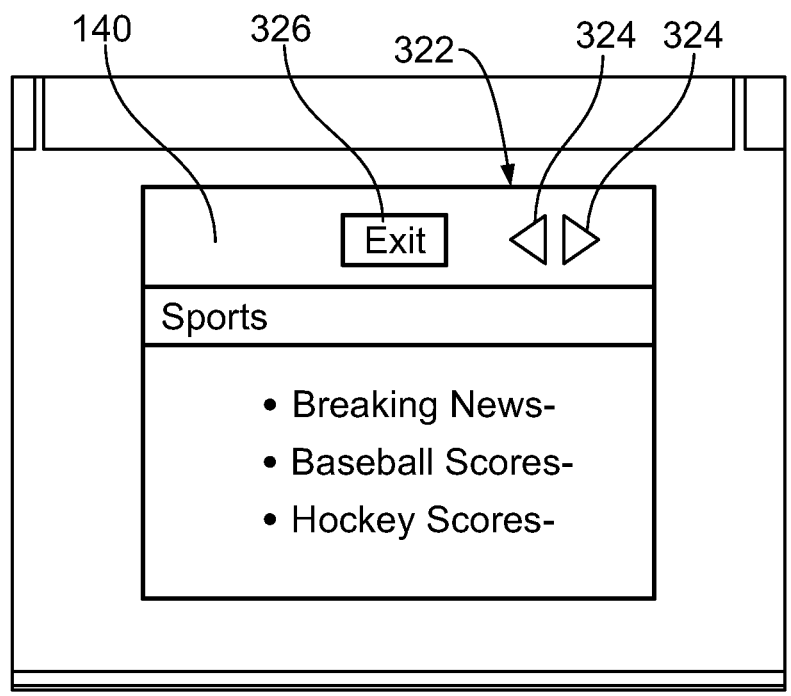
FIG. 10 illustrates the touchpad of the electronic device displaying a news content notification GUI according to an embodiment.

FIG. 10 illustrates the touchpad 140 of the electronic device 110 (shown in FIG. 1) displaying a news content notification GUI 322 according to an embodiment. The news content notification GUI 322 may display news content from various sources, such as Internet-based news companies. The news content may include sports news and scores, political news, local news, national news, global news, and the like. The news content may be configurable such that the user can select which sources and types of news are presented to the user via the touchpad display 204 (shown in FIG. 2). In the illustrated embodiment, the news content is sports news, and includes breaking news, baseball scores, and hockey scores. Optionally, the news content may scroll across the touchpad 140. The new content notification GUI 322 also includes virtual arrow buttons 324 for viewing different news content. The news content notification GUI 322 further includes an Exit button 326 for removing the news content notification GUI 322 from being displayed on the touchpad 140. The news content notification GUI 322 may be displayed on the touchpad 140 in response to the user selecting a key on the keyboard 120 (shown in FIG. 1). Optionally, the news content notification GUI 322 may be displayed on the touchpad 140 automatically after a threshold amount of time has passed without the user making a user touch input on the touchpad 140. For example, after the threshold amount of time has been exceeded in which the no user touch input has been received, the processor may present the news content notification GUI 322 on the touchpad 140. In addition, or as an alternative, to news content, the processor may present advertisements on the touchpad 140.

In the illustrated embodiment, the news content notification GUI 322 occupies the entire area of the touchpad 140. However, in an alternative embodiment, the news content notification GUI 322 may occupy only a portion of the touchpad 140. For example, the news content notification GUI 322 may occupy only a top region of the touchpad 140, such that scrolling news content is presented along only the top region of the touchpad 140. The remaining bottom region of the touchpad 140 outside of the top region may be configured as a typical touchpad 140 such that user touch inputs on the bottom region control movement and activation of a cursor on the primary display 118 (shown in FIG. 1).

Figure 11:
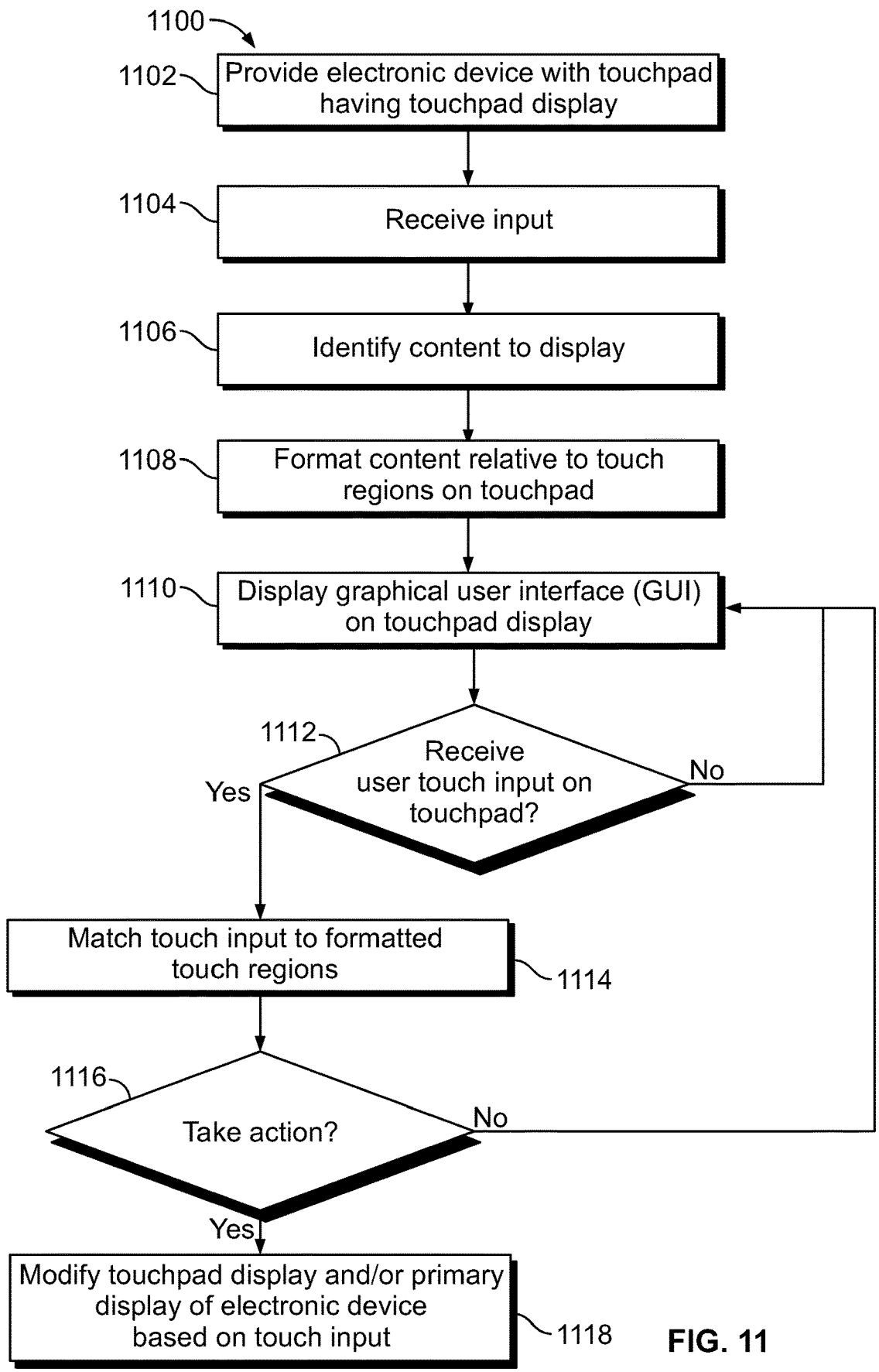
FIG. 11 is a flow chart showing a method for configuring an electronic device according to an embodiment.

FIG. 11 is a flow chart showing a method 1100 for configuring an electronic device according to an embodiment. At 1102, an electronic device is provided with a touchpad having a touchpad display. For example, the electronic device includes a main body unit having a keyboard and the touchpad both on a top side of the main body unit. The keyboard and the touchpad are located in separate, discrete areas of the top side. The touchpad includes a touch sensor configured to monitor user touch inputs on the touchpad. The touchpad display may cover at least a portion of the touch sensor, such that visual graphics may be displayed over the touch sensor. The electronic device may additionally include a display unit that is movably coupled to the main body unit via one or more hinges. The display unit includes a primary display. In an embodiment, the touchpad display is composed of an electronic paper screen, such that graphics provided by the touchpad display consume a low amount of energy. Optionally, the graphics provided by the touchpad display only consume energy when the graphics change. In an embodiment, the primary display may be composed of an LCD screen, an LED screen, an OLED screen, a plasma screen, or the like, but is not composed of an electronic paper screen.

At 1104, an input is received by the electronic device. The input triggers the electronic device to display a GUI on the touchpad display. The input may be a direct user input, receipt of a message notification from a remote source, initiation of a program associated with a specific touchpad GUI, and/or a scheduled time-based alert. The direct user input may include a user depressing a key of the keyboard, clicking a mouse, tapping on the touchpad, or the like. For example, the user may press a key on the keyboard that corresponds to a hotkey GUI, and the one or more processors may display the hotkey GUI 184 (shown in FIG. 7) on the touchpad display responsive to the direct user input. The receipt of a message notification may include receipt of a new text message, email message, voicemail message, event invitation, updated news information, advertisement content, or the like from a remote source. The remote source may be an electronic device of a person that has a personal relationship with the user and/or a server of a news company and/or a marketing company or the like. For example, upon receipt of an incoming new email message, the one or more processors may display the new message notification GUI 302 (shown in FIG. 8) on the touchpad display. The initiation of a program associated with a specific touchpad GUI refers to a user selecting programs such as a calculator program, a calendar program, a media player program, a phone program, or the like. For example, upon the user initiating the calculator program by selecting the calculator program with a user input, the one or more processors of the electronic device may be configured to display the calculator GUI 162 (shown in FIG. 3) on the touchpad display. The scheduled time-based alert may be stored in a memory of the electronic device. For example, in response to detecting that a scheduled event stored in a calendar program begins in fifteen minutes, the one or more processors may display the schedule reminder notification 312 (shown in FIG. 9) to remind the user of the scheduled event. Therefore, the input may be an internal time-based alert.

At 1106, content to display is identified. For example, the one or more processors of the electronic device may receive the user input and access the memory of the electronic device to identify which content to display on the touchpad display based on the user input that is received. The content may include the calculator GUI 162 (shown in FIG. 3), the phone GUI 170 (shown in FIG. 4), the media control GUI 174 (shown in FIG. 5), the calendar GUI 182 (shown in FIG. 6), the hotkey GUI 184 (shown in FIG. 7), the message notification GUI 302 (shown in FIG. 8), the schedule reminder notification 312 (shown in FIG. 9), the news content notification GUI 322 (shown in FIG. 10), or the like. For example, the electronic device may include a look-up table stored in the memory that associates various different inputs with corresponding content to be displayed on the touchpad display. In response to receiving the input at 1104, the one or more processors may access the look-up table in the memory to determine which content to display. The content includes the GUI-specific content, such as the type, colors, and arrangement of content in the GUI, including the virtual buttons of the GUI. The content also includes specific data, such as data received from a user input, data received from an incoming message, and the like. The processor is configured to display the data as well as the GUI-specific content on the touchpad display.

At 1108, the content is formatted relative to touch regions on the touchpad. For example, the touchpad includes a touch sensor that partitions the touchpad area into a grid or an array having multiple touch regions. The touch regions may be organized into multiple columns and rows, and each touch region may be classified based on the coordinates of the touch region (e.g., X1Y1, X2Y1, X1Y2, X2Y2, and the like). The virtual buttons of each GUI are formatted to be located at certain touch regions of the touchpad. For example, the Read button 304 of the message notification GUI 302 (shown in FIG. 8) may be formatted to be associated with three touch regions (e.g., with coordinates X5Y4, X6Y4, and X7Y4). Due to the formatting, in response to the touch sensor detecting a user touch input of a tap on at least one of the three touch regions, the processor is configured to associate the user touch input with a user request to read the message. The processor may therefore open the message and display the contents of the message to the user. The content is formatted on the touchpad in order to associate locations and types (e.g., single tap, double tap, drag, hold, etc.) of user touch inputs on the touchpad with user requests or commands for interacting with the corresponding program.

At 1110, a GUI is displayed on the touchpad display. The touchpad display may be under the control of a processor configured with specific executable program instructions, such as instructions stored in one or more storage media or memories of the electronic device. The GUI that is displayed may be specific to an active program that is running (e.g., operating or being executed) on the electronic device, such as a calculator program, a calendar program, a media player program, a phone program, or the like. The GUI has one or more virtual buttons that are selectable by a user via a user touch input on the touchpad. In various embodiments, the GUI displayed on the touchpad display may be a calculator GUI having a virtual number pad, a phone GUI having a virtual dial pad, a calendar GUI having a virtual calendar, and/or a media control GUI having virtual media control buttons. The touchpad display may also display a notification GUI that includes a visual message notification. The visual message notification may be an event invitation, a schedule reminder, news content, advertisements, and/or an incoming new message. The notification GUIs may be displayed on the touchpad display in response to the electronic device receiving data representative of the notification. For example, the new message notification GUI may be displayed responsive to a communication device (e.g., a wireless transceiver) of the electronic device wirelessly receiving a data packet representative of the new message content.

At 1112, a determination is made whether a user touch input on the touchpad has been received. The determination is made using the touch sensor of the touchpad and the processor of the electronic device. If no user touch input is received, flow of the method 1100 may return to 1110 and the GUI may continue to be displayed. In an embodiment, after a certain threshold amount of time, the processor may control the touchpad display to remove the GUI from being displayed. For example, a certain GUI may time out if no user touch inputs are received within one minute (or another designated amount of time) of the GUI initially being displayed on the touchpad. After the threshold amount of time, the touchpad display may revert to the cursor-manipulation mode, a previous GUI, or the like. Alternatively, the touchpad display may continue to display a certain GUI associated with an active program until the active program is deactivated or a user touch input is received on the virtual Back or Exit button on the GUI.

If it is determined at 1112 that a user touch input has been received, then flow of the method 1100 continues to 1114 and the touch input is matched to formatted touch regions of the touchpad. For example, the touch input may be different types of inputs, such as a single tap on one touch region, a double tap on one touch region, a double touch indicating a single tap on two different touch regions, a drag across multiple touch regions, an extended hold on one touch region, and the like. The touch input may also be in different locations relative to the touchpad. The touch sensor is configured to determine the physical information about the user touch input, such as a location and type of the touch input and any movement information about the touch. The one or more processors are configured to match the touch input to specific functions or operations on the displayed GUI. For example, the processor is able to associate a single tap in the top left touch region with a user input of the number 7 in the number pad of the calculator GUI 162 shown in FIG. 3. The processor is able to associate the same single tap in the top left touch region of the touchpad with a user input of the number 1 in the dial pad of the phone GUI 170 shown in FIG. 4. Therefore, due to formatting and matching, the processor is able to associate different inputs with the exact same type and location of user touch input on the touchpad when different GUIs are displayed.

At 1116, a determination is made whether to take any action. In some GUIs, such as the news content GUI 322 (shown in FIG. 10), a user touch input may not require the one or more processors to take any action regarding the display of a GUI on the touchpad display. For example, the GUI may have an area specifically designated for cursor manipulation. A received user touch input within the cursor-manipulation area may result in the location of a cursor on the primary display moving relative to the primary display. However, such movement of the cursor may not cause the processor to take any action regarding the touchpad display. However, some user touch inputs may cause actions, such as if a user selects one of the virtual buttons on a GUI that is displayed on the touchpad display.

If it is determined at 1116 that action is to be taken, then flow of the method 1100 continues to 1118 and the touchpad display is modified and/or a visual representation of an active program displayed on the primary display is modified. In response to receiving a user touch input on a virtual button of a GUI displayed on the touchpad display, program instructions corresponding to an active program may be executed based on the virtual button that is selected. For example, in response to a user touch input on a virtual Back button of a GUI, the processor may take action to close or remove the GUI from being displayed on the touchpad display. In addition, a touch input that selects one of the arrow buttons on a GUI may cause the processor to modify the touchpad display by, for example, scrolling through different news content, messages, schedule events, and the like that are displayed. The visual representation of an active program displayed on the primary display may be modified by, for example, displaying text (e.g., numbers and letters) selected via the touchpad GUI on a virtual calculator, a virtual phone, an email message, or the like, that is displayed on the primary display. Thus, selecting the number 4 on the number pad of the calculator GUI 162 (shown in FIG. 3) would cause the processor to display the number 4 in the virtual calculator displayed on the primary display.

FIG. 12 illustrates a simplified block diagram of internal components of the electronic device 110 configured to manage content display on a touchpad display in accordance with embodiments herein. The device 110 includes components such as one or more wireless transceivers 1202, one or more processors 1204 (e.g., a microprocessor, microcomputer, application-specific integrated circuit, etc.), one or more local storage media (also referred to as memories) 1206, a user interface 1208 which includes one or more input devices 1209 and one or more output devices 1210, a power module 1212, a component interface 1214, and a camera unit 1216 configured to capture image data. All of these components can be operatively coupled to one another, and can be in communication with one another, by way of one or more internal communication links, such as an internal bus.

The input and output devices 1209, 1210 may each include a variety of visual, audio, and/or mechanical devices. For example, the input devices 1209 can include a visual input device such as an optical sensor or camera, an audio input device such as a microphone, and a mechanical input device such as a keyboard, a keypad, a switch, a touchpad, a touch screen, and/or any combination thereof. Similarly, the output devices 1210 can include a visual primary display, one or more light emitting diode indicators, an audio output device such as a speaker, alarm and/or buzzer, and a mechanical output device such as a vibrating mechanism. The primary display may be touch sensitive to various types of touch and gestures. As further examples, the output device(s) 1210 may include a touch sensitive screen, a non-touch sensitive screen, a text-only display, a smart phone display, an audio output (e.g., a speaker or headphone jack), and/or any combination thereof. In one or more embodiments, the output devices 1210 include a touchpad (TP) display 1252 on the touchpad. The touchpad display 1252 optionally includes an electronic paper screen.

The one or more wireless transceivers 1202 can utilize a known wireless technology for communication. Exemplary operation of the wireless transceivers 1202 in conjunction with other components of the device 110 may take a variety of forms and may include, for example, operation in which, upon reception of wireless signals, the components of device 110 detect communication signals from secondary devices and the transceiver 1202 demodulates the communication signals to recover incoming information, such as responses to inquiry requests, voice and/or data, transmitted by the wireless signals. The one or more processors 1204 format outgoing information and conveys the outgoing information to one or more of the wireless transceivers 1202 for modulation to communication signals. The wireless transceivers 1202 convey the modulated signals to a remote device, such as a cell tower or a remote server (not shown).

The one or more memories 1206 can encompass one or more memory devices of any of a variety of forms (e.g., read only memory, random access memory, static random access memory, dynamic random access memory, etc.) and can be used by the one or more processors 1204 to store and retrieve data. The data that is stored by the one or more memories 1206 can include, but need not be limited to, operating systems, applications (e.g., programs), user collected content, and informational data. Each operating system includes executable code that controls basic functions of the device, such as interaction among the various components, communication with external devices via the wireless transceivers 1202 and/or the component interface 1214, and storage and retrieval of programs and data to and from the memory 1206. Each program or application includes executable code that utilizes an operating system to provide more specific functionality for the communication devices, such as file system service and handling of protected and unprotected data stored in the memory 1206.

A display management (DM) application 1224 is stored in the memory 1206. The DM application 1224 includes program instructions accessible by the one or more processors 1204 to direct a processor 1204 to implement the methods, processes, and operations described herein including, but not limited to the methods, processes, and operations illustrated in the figures and described in connection with the figures. The DM application 1224 manages operation of the processor 1204, the display driver 1250 and/or a video card in connection with displaying desired content on the primary display and the touchpad display 1252. In accordance with at least one embodiment, the DM application 1224 directs the processor 1204 to display a GUI on the touchpad display 1252. The GUI may include alert content (e.g., event reminders, breaking news, etc.), calendar content (e.g., scheduled events), message content (e.g., new text messages, email messages, and/or voicemail messages), advertisement content, news content, or personalized content (e.g., configurable hotkeys).

Other applications stored in the memory 1206 include various application program interfaces (APIs), some of which provide links to/from the cloud hosting service. The power module 1212 preferably includes a power supply, such as a battery, for providing power to the other components while enabling the device 110 to be portable, as well as circuitry providing for the battery to be recharged. The component interface 1214 provides a direct connection to other devices, auxiliary components, or accessories for additional or enhanced functionality, and in particular, can include a USB port for linking to a user device with a USB cable. Optionally, the electronic device 110 may include an infrared (IR) transmitter/receiver 1218 that may be utilized in connection with controlling one or more secondary devices through transmission and reception of IR signals.

A display driver 1250 is coupled to the processor 1204 and configured to manage display of content on one or more displays, such as the touchpad display 1252 and/or a primary display of the output devices 1210. The display driver 1250 writes the desired content to the touchpad display 1252 under direction of the main processor 1204. For example, the display driver 1250 may manage the display of content on the touchpad display 1252. Optionally, the display driver 1250 includes display memory 1254 and one or more display control processors 1256. The display memory 1254 includes multiple sections to which the display control processor 1256 and/or processor 1204 write content to be displayed. The sections of the display memory 1254 may be mapped to corresponding regions of the touchpad. Alternatively, the display driver 1250 may omit a separate processor and memory, and utilize sections of the memory 1206 as display memory and the processor 1204 to manage writing content to a display memory section within the memory 1206.

Before concluding, it is to be understood that although, for example, a software application for undertaking embodiments herein may be vended with a device such as the electronic device 110, embodiments herein apply in instances where such an application is downloaded from a server to a device over a network such as the Internet. Furthermore, embodiments herein may also apply in instances where such an application is included on a computer readable storage medium that is being vended and/or provided, and the computer readable storage medium is not a carrier wave or a signal per se.

As will be appreciated by one skilled in the art, various aspects may be embodied as a system, method, or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-transitory computer (device) readable medium(s) may be utilized. The non-transitory medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic device, comprising:
   a memory to store program instructions;
   one or more processors to execute the program instructions;
   a main body unit having a housing comprising a top side, the main body unit further including a keyboard and a touchpad disposed along the top side of the housing, the keyboard and the touchpad located in discrete areas of the top side, the touchpad including a touch sensor and a touchpad display covering at least a portion of the touch sensor; and
   a primary display moveably coupled to the main body unit,
   wherein the touchpad is configured to switch between a cursor manipulation mode and a program mode, wherein, while the touchpad is in the cursor manipulation mode, the one or more processors move a cursor that is displayed on the primary display based on a user touch input on the touchpad, wherein, while the touchpad is in the program mode, the one or more processors display a graphical user interface (GUI) having one or more virtual buttons on the touchpad display and execute the program instructions responsive to receiving a user touch input on the touchpad at the respective one or more virtual buttons, the GUI and the program instructions being specific to a corresponding program, wherein the one or more processors execute the program instructions by updating a visual representation of the corresponding program displayed on the primary display.

2. The electronic device of claim 1, wherein the touchpad display comprises an electronic paper screen.

3. The electronic device of claim 1, wherein the GUI is a notification GUI that displays a visual message notification.

4. The electronic device of claim 1, wherein, while the touchpad is in the program mode, the one or more processors display, as the GUI, a virtual number pad on the touchpad display.

5. The electronic device of claim 1, wherein, while the touchpad is in the program mode, the one or more processors display, as the GUI, a virtual dial pad on the touchpad display.

6. The electronic device of claim 1, wherein, while the touchpad is in the program mode, the one or more processors display, as the GUI, a virtual calendar on the touchpad display.

7. The electronic device of claim 1, wherein, while the touchpad is in the program mode, the one or more processors display, as the GUI, virtual media control buttons on the touchpad display.

8. The electronic device of claim 1, wherein the virtual buttons of the GUI include configurable hotkeys.

9. The electronic device of claim 1, wherein the user touch input on the touchpad at a respective virtual button of the one or more virtual buttons is at a location of the touchpad that overlaps a location that the respective virtual button is displayed on the touchpad display.

10. The electronic device of claim 1, wherein the primary display has one or more of a light emitting diode (LED), organic light emitting diode (OLED), liquid crystal display (LCD, or plasma screen, and the touchpad display has an electronic paper screen that is monochromatic.

11. The electronic device of claim 1, wherein the touchpad is configured to switch from the cursor manipulation mode to the program mode upon activation of the program that corresponds to the GUI and the program instructions.

12. The electronic device of claim 1, wherein the touchpad is configured to switch from the cursor manipulation mode to the program mode in response to a user touch input on the touchpad that manipulates the cursor to select an icon that is displayed on the primary display, the icon representing the program that corresponds to the GUI and the program instructions, wherein selecting the icon activates the program.

13. The electronic device of claim 1, wherein the touchpad is configured to switch from the program mode to the cursor manipulation mode upon deactivation of the program that corresponds to the GUI and the program instructions.

14. The electronic device of claim 1, wherein the touchpad display utilizes a different display technology than the primary display, and the touchpad display consumes less energy than the primary display.

15. A method comprising:
displaying a cursor on a primary display of an electronic device while in a cursor manipulation mode of a touchpad of the electronic device, the electronic device comprising a main body unit and the primary display moveably coupled to the main body unit, the main body unit including a keyboard and the touchpad on a top side of the main body unit, the keyboard and the touchpad located in discrete areas of the top side, the touchpad including a touch sensor and a touchpad display covering at least a portion of the touch sensor;
responsive to receiving a user touch input on the touchpad while in the cursor manipulation mode, moving the cursor relative to the primary display;
responsive to activation of a program, displaying a graphical user interface (GUI) associated with the active program on the touchpad display and displaying a visual representation of the active program on the primary display while in a program mode of the touchpad, the GUI on the touchpad display having one or more virtual buttons selectable via a user touch input on the touchpad,; and
responsive to receiving a user touch input on the touchpad at the respective one or more virtual buttons of the GUI while in the program mode, executing program instructions of the active program based on the one or more virtual buttons selected and updating the visual representation of the active program that is displayed on the primary display.

16. The method of claim 15, further comprising, responsive to receiving the user touch input on the touchpad at the one or more virtual buttons, modifying the GUI that is displayed on the touchpad display based on the user touch input.

17. The method of claim 15, wherein displaying the GUI on the touchpad display includes monochromatically displaying the GUI on an electronic paper screen of the touchpad display.

18. The method of claim 15, wherein the GUI is a notification GUI that includes a visual message notification, the notification GUI being displayed on the touchpad display responsive to receiving data representative of the visual message notification.

19. A computer program product comprising a non-transitory computer readable storage medium comprising computer executable code to:
display a cursor on a primary display of an electronic device while in a cursor manipulation mode of a touchpad of the electronic device, the electronic device comprising a main body unit and the primary display moveably coupled to the main body unit, the main body unit including a keyboard and the touchpad on a top side of the main body unit, the touchpad including a touchpad display;
responsive to receiving a user touch input on the touchpad while in the cursor manipulation mode, move the cursor relative to the primary display;
responsive to activation of a program, display a graphical user interface (GUI) specific to the program on the touchpad display and display a visual representation of the program on the primary display while in a program mode of the touchpad, the GUI on the touchpad display having one or more virtual buttons selectable via a user touch input on the touchpad; and
responsive to receiving a user touch input on the touchpad selecting one or more virtual buttons of the GUI while in the program mode, execute program instructions of the program based on the one or more virtual buttons selected and update the visual representation of the program displayed on the primary display of the electronic device.

20. The program product of claim 19, wherein the non-transitory computer readable storage medium further comprises executable code to display, as the GUI, at least one of a visual message notification, a virtual number pad, a virtual dial pad, a virtual calendar, virtual media control buttons, or virtual configurable hotkeys on the touchpad display.

* * * * *